(12) United States Patent
Yoneda

(10) Patent No.: US 8,547,716 B2
(45) Date of Patent: Oct. 1, 2013

(54) POWER CONVERTING APPARATUS, GRID INTERCONNECTION APPARATUS AND GRID INTERCONNECTION SYSTEM

(75) Inventor: Fumiiki Yoneda, Moriguchi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 13/338,944

(22) Filed: Dec. 28, 2011

(65) Prior Publication Data
US 2012/0134191 A1 May 31, 2012

Related U.S. Application Data

(63) Continuation of application No. PCT/JP2011/054403, filed on Feb. 25, 2011.

(30) Foreign Application Priority Data

Feb. 26, 2010 (JP) ................. 2010-042445

(51) Int. Cl.
*H02M 7/527* (2006.01)
(52) U.S. Cl.
USPC .......................... 363/98; 363/124; 323/906
(58) Field of Classification Search
USPC ............. 363/39, 40, 65, 95, 97, 98, 131, 132, 363/124; 323/266, 906
See application file for complete search history.

(56) References Cited

U.S. PATENT DOCUMENTS

| 7,855,906 B2* | 12/2010 | Klodowski et al. ............. 363/97 |
| 8,067,855 B2* | 11/2011 | Mumtaz et al. ................. 307/45 |
| 2008/0205096 A1* | 8/2008 | Lai et al. ......................... 363/40 |

FOREIGN PATENT DOCUMENTS

| JP | 10-014112 A | 1/1998 |
| JP | 2004-357442 A | 12/2004 |
| JP | 2007-174866 A | 7/2007 |

OTHER PUBLICATIONS

International Search Report of PCT/JP2011/054403, mailing date May 24, 2011.

* cited by examiner

*Primary Examiner* — Gary L Laxton
(74) *Attorney, Agent, or Firm* — Westerman, Hattori, Daniels & Adrian, LLP

(57) ABSTRACT

A power converting apparatus comprises a DC-DC converter circuit that steps up or steps down an input voltage from a DC power supply, a DC-AC converter circuit that converts an intermediate voltage outputted by the DC-DC converter circuit to an alternate current, and a control circuit that controls the DC-DC converter circuit and the DC-AC converter circuit. The control circuit is provided with a circuit control unit that controls the DC-DC converter circuit so that the modulation factor, which is the amplitude ratio between a signal wave for manipulating the DC-AC converter circuit and the carrier wave therefor, will become a target modulation factor.

11 Claims, 6 Drawing Sheets

(a)

(b)

POWER CONVERTING APPARATUS, GRID INTERCONNECTION APPARATUS AND GRID INTERCONNECTION SYSTEM

CROSS REFERENCE

This application is a Continuation of PCT Application No. PCT/JP2011/054403 filed on Feb. 25, 2011, and claims the priority of Japanese Patent Application No. 2010-042445, filed on Feb. 26, 2010, the content of both of which is incorporated herein by reference.

TECHNICAL FIELD

The present invention relates to a power converting apparatus, a grid interconnection apparatus and a grid interconnection system which steps up or down voltage from a DC power supply, such as a solar cell and a fuel cell, and then converts the voltage into AC voltage.

BACKGROUND ART

In the related art, this kind of power converting apparatus is provided with a DC-DC converter circuit which steps up or down voltage from a DC power supply, a DC-AC converter circuit (inverter) which converts output voltage (hereinafter, referred to as intermediate voltage) of the DC-DC converter circuit into AC, and a control unit which controls the DC-DC converter circuit and the DC-AC converter circuit.

In such a power converting apparatus, there is a problem that, if input voltage (intermediate voltage) to the DC-AC converter circuit is insufficient with respect to a peak value of voltage that the DC-AC converter circuit should output, an output current of the DC-AC converter circuit is distorted near the peak value. On the other hand, if the intermediate voltage is too high, switching loss of each of a device in the DC-DC converter circuit and a device in the DC-AC converter circuit increases, whereby conversion efficiency is impaired.

For this reason, it is preferred that input voltage (intermediate voltage) to the DC-AC converter circuit is higher than the peak value of voltage which the DC-AC converter circuit outputs by an amount of a margin (an amount influenced) because of, for example, an influence of the amount of current that the DC-AC converter circuit outputs to the load (the load and a distribution system in a case in which the DC-AC converter circuit is used as a grid interconnection apparatus) and an influence of voltage drop in the device of the DC-AC converter circuit.

The power converting apparatus needs to determine the peak value of voltage that the DC-AC converter circuit outputs in consideration of voltage which the load requires and the margin because the peak value is affected by voltage that the load requires.

As a related art example of such a power converting apparatus, a system in which voltage (grid voltage) of the distribution system is detected and sets a value obtained by adding a predetermined margin to the peak value of the grid voltage as an intermediate voltage target value is proposed.

However, an appropriate margin between the intermediate voltage and the peak value of the grid voltage depends on, for example, voltage drop of a main circuit component which exists in the section and on the length of dead time during which short-circuit between upper and lower arms, and thus changes due to, for example, the amount of output current and variation in the main circuit component.

Therefore, in the power converting apparatuses disclosed in Patent Literatures 1 and 2 which process the margin as a constant value, it has not been possible to properly control the intermediate voltage.

CITATION LIST

Patent Literature

Patent Literature 1: Japanese Unexamined Patent Application Publication No. 10-14112
Patent literature 2: Japanese Unexamined Patent Application Publication No. 2007-174866

SUMMARY OF THE INVENTION

A power converting apparatus according to a first feature includes a DC-DC converter circuit (step-up chopper circuit 2) configured to step up or down input voltage (input voltage Vi) from a DC power supply (e.g. solar cell), a DC-AC converter circuit (inverter circuit 3) configured to convert intermediate voltage (intermediate voltage Vd) output by the DC-DC converter circuit into alternating-current and a control unit (control unit 120) configured to control the DC-DC converter circuit and the DC-AC converter circuit. The control unit is provided with a circuit control unit (step-up chopper control unit 124) configured to control the DC-DC converter circuit such that a modulation factor which is an amplitude ratio between a signal wave and a carrier wave which manipulate the DC-AC converter circuit becomes a target modulation factor.

According to the feature, the circuit control unit controls the DC-DC converter circuit such that an amplitude ratio (modulation factor) of the signal wave and the carrier wave becomes a target modulation factor. It is therefore possible to control the intermediate voltage appropriately while suppressing influences on the level of output of the DC-AC converter circuit and on variation of element characteristics, for example.

In the first feature, the power converting apparatus further includes an operating signal generation unit (an operating signal generation unit 121) configured to generate an operating signal as the signal wave, and a target value setting unit (an intermediate voltage target value setting unit 123) configured to set a target voltage value (an intermediate voltage target value SV2) of the intermediate voltage in accordance with the operating signal generated by the operating signal generation unit. The circuit control unit controls the DC-DC converter circuit such that the intermediate voltage becomes the target voltage value.

According to the feature, the intermediate voltage target value is set in accordance with the operating signal which defines the modulation factor. Therefore, the intermediate voltage target value can be set in consideration of the modulation factor of the DC-AC converter circuit, i.e., the intermediate voltage target value can be set while suppressing the influence of, for example, the amount of the output of the DC-AC converter circuit and variation in the element characteristics, whereby the intermediate voltage can be controlled properly.

In the first feature, the target value setting unit increases the target voltage value when the modulation factor exceeds the target modulation factor.

Under the condition that the modulation factor exceeds the target modulation factor, there is a possibility that the intermediate voltage is low with respect to the AC voltage that DC-AC converter circuit should output, and the output current of the DC-AC converter circuit is distorted near the peak value. In such a case, it is possible in the present characteristics to avoid the distortion of the output current of the DC-AC converter circuit near the peak value by increasing the intermediate voltage target value.

In the first feature, the target value setting unit sets an increase width of the target voltage value as a first increase width when a value by which the modulation factor exceeds the target modulation factor is smaller than a predetermined value, and the target value setting unit sets an increase width of the target voltage value as a second increase width larger than the first increase width when a value by which the modulation factor exceeds the target modulation factor is the same as or larger than the predetermined value.

Under the condition that the modulation factor exceeds the target modulation factor by a value greater than a predetermined value, the intermediate voltage becomes too low with respect to the AC voltage that the DC-AC converter circuit should output, and thus there is a possibility that the output current of the DC-AC converter circuit is distorted significantly near the peak value. In such a case, in the present characteristics, distortion of the output current of the DC-AC converter circuit near the peak value can be avoided by significantly increasing the intermediate voltage target value to thereby achieve rapid response.

In the first feature, the target voltage value is lowered when the modulation factor does not reach the target modulation factor.

Under the condition that the modulation factor does not reach the target modulation factor, the intermediate voltage is too high with respect to the AC voltage that the DC-AC converter circuit should output, and thus there is a possibility that switching loss of each of a device in the DC-DC converter circuit and a device in the DC-AC converter circuit is increased. In such a case, in the present characteristics, an increase in switching loss of each of a device in the DC-DC converter circuit and a device in the DC-AC converter circuit can be avoided by lowering the intermediate voltage target value.

In the first feature, the DC power supply is a solar cell, a fuel cell or a storage battery.

A grid interconnection apparatus according to a second feature includes the power converting apparatus according to the first feature. The power converting apparatus is configured to interconnect the DC power supply to a distribution system.

According to the feature, it is possible to configure the grid interconnection apparatus using a power converting apparatus with reduced increase in switching loss and reduced distortion of an output current waveform; such a configuration can contribute to high reliability and high efficiency of the entire grid interconnection apparatus.

A grid interconnection system according to a third feature includes the DC power supply and the power converting apparatus according to the first feature. The power converting apparatus is configured to interconnect the DC power supply to a distribution system.

According to the feature, it is possible to configure the grid interconnection system using a power converting apparatus with reduced increase in switching loss and reduced distortion of an output current waveform; such a configuration can contribute to high reliability and high efficiency of the entire grid interconnection system.

BRIEF DESCRIPTION OF THE DRAWINGS

FIG. 3(a) illustrates a process for each control period and FIG. 3(b) illustrates a process for each period of commercial frequency.

MODES FOR CARRYING OUT THE INVENTION

Figure 1:
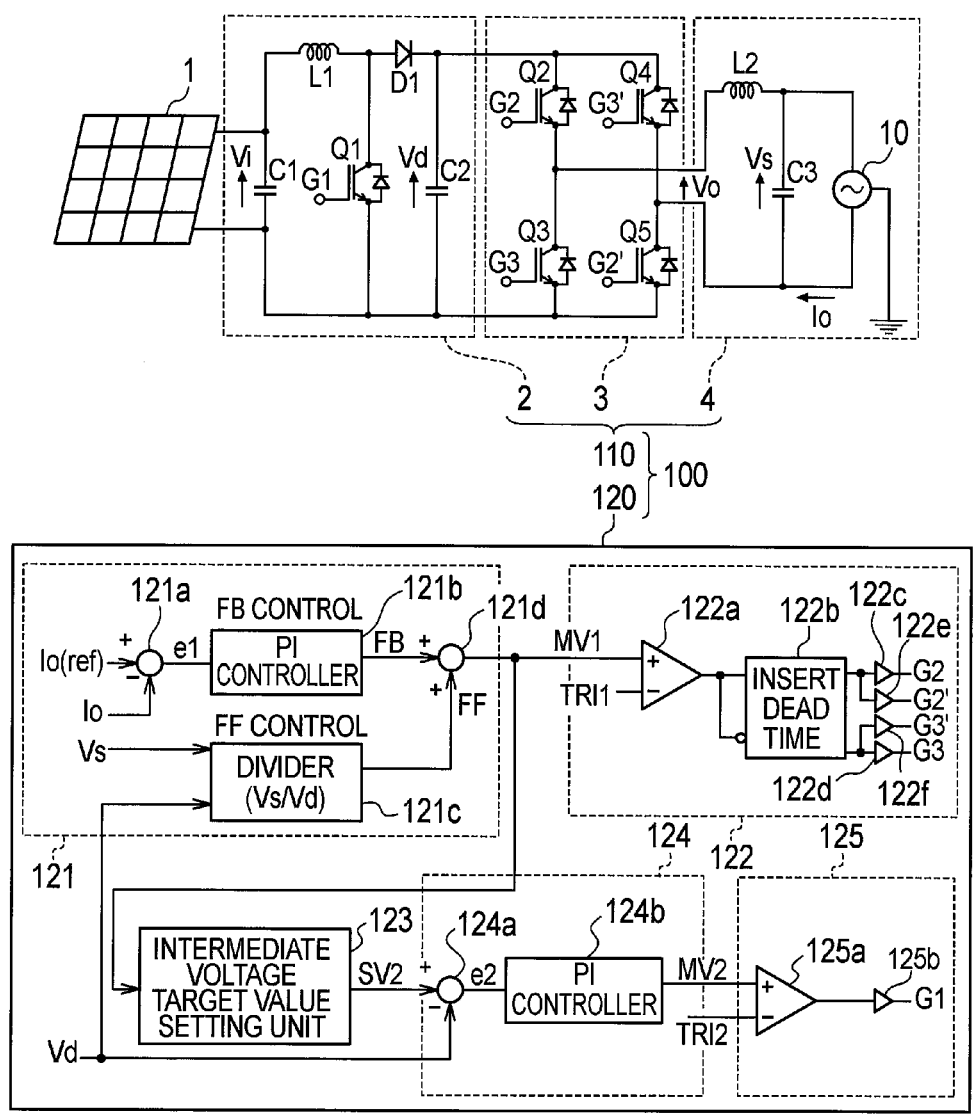
FIG. 1 is a diagram illustrating a configuration of a grid interconnection system provided with a grid interconnection apparatus according to an embodiment of the present invention.

An embodiment of the present invention will be described with reference to the drawings.

In the drawings in the embodiment, identical or similar reference numerals are given to identical or similar components.

In the embodiment, an example in which the power converting apparatus of the present invention is applied to a photovoltaic grid interconnection apparatus (a power conditioner) will be described. Hereinafter, description will be given in the order of (1) Entire Schematic Structure, (2) Configuration of Main Circuit, (3) Configuration of Control Unit, (4) Operation of Control Unit, (5) Operation and Effect, (6) Modification 1, (7) Modification 2 and (8) Other Embodiments.

(1) Entire Schematic Structure

FIG. 1 is a diagram illustrating a configuration of a grid interconnection system provided with a grid interconnection apparatus 100 according to the present embodiment. In the present embodiment, a transless grid interconnection apparatus 100 will be described as an example.

As illustrated in FIG. 1, the grid interconnection system is provided with a solar cell 1, the grid interconnection apparatus 100 and a distribution system 10. The solar cell 1 is a DC power supply for a distributed energy generation system which outputs DC power produced by power generation in accordance with sunlight irradiation.

The grid interconnection apparatus 100 converts DC power from the solar cell 1 into AC power of the commercial frequency (for example, 50 Hz or 60 Hz). Load (not illustrated) installed in a consumer is connected between the grid interconnection apparatus 100 and the distribution system 10. The grid interconnection apparatus 100 performs a grid operation to supply the load with AC power from both the grid interconnection apparatus 100 and the distribution system 10.

The grid interconnection apparatus 100 is provided with a main circuit 110 and a control unit 120 which controls the main circuit 110. In the present embodiment, the main circuit 110 and the control unit 120 constitute a power converting apparatus.

The main circuit 110 is provided with a step-up chopper circuit 2, an inverter circuit 3 connected subsequent to the step-up chopper circuit 2 and a filter circuit 4 connected subsequent to the inverter circuit 3. "Preceding" means the side of the solar cell 1 and "subsequent" means the side of the distribution system 10.

The step-up chopper circuit 2 steps up the input voltage Vi from the solar cell 1 by high-frequency switching at all times. In the present embodiment, the step-up chopper circuit 2 constitutes a DC-DC converter circuit.

The inverter circuit 3 converts intermediate voltage Vd output by the step-up chopper circuit 2 into AC. In the present embodiment, the inverter circuit 3 constitutes a DC-AC converter circuit.

The filter circuit 4 removes a high frequency component of AC power output from the inverter circuit 3 and outputs that AC power to the distribution system 10 (and to the load). The distribution system 10 is, for example, a distribution system of single phase 200V.

The control unit 120 controls a step-up operation by the step-up chopper circuit 2 using a drive pulse G1 which drives the step-up chopper circuit 2. The control unit 120 controls an operation of the inverter circuit 3 using drive pulses G2 and G3 which drive the inverter circuit 3. As a configuration of the control unit 120 involved in the generation of the drive pulses G2 and G3, an existing circuit configuration is used.

(2) Configuration of Main Circuit

With continuous reference to FIG. 1, a configuration of the main circuit 110 will be illustrated.

The step-up chopper circuit 2 is provided with an input stage condenser C1, a reactor L1, a switching element Q1, a diode D1 and an intermediate stage capacitor C2. Although an insulated gate bipolar transistor (IGBT) is exemplified as the switching element Q1 in the present embodiment, the switching element Q1 may also be a power MOSFET, for example.

The input stage condenser C1 is connected between lines of positive side and negative side, and smoothes input voltage V1 from the solar cell 1. The reactor L1 is provided on a line of positive side.

The switching element Q1 steps up the input voltage V1 by high-frequency switching in response to the drive pulse G1 from the control unit 120 and an input current waveform is controlled by the control unit 120 modulating a pulse width of the drive pulse G1 (PWM control).

The intermediate stage capacitor C2 is for removing a high frequency component included in the intermediate voltage Vd. The intermediate voltage Vd is voltage between both ends of the intermediate stage capacitor C2, and is output as output voltage of the step-up chopper circuit 2.

The inverter circuit 3 is provided with a switching element Q2, a switching element Q3, a switching element Q4 and a switching element Q5 which are full-bridge connected. Although the IGBT is exemplified as the switching elements Q2 to Q5, the switching elements Q2 to Q5 may also be a power MOSFET, for example. Each of diodes is connected antiparallel to each of the switching elements Q2 to Q5. Each of the switching elements Q2 to Q5 performs high-frequency switching in response to a drive pulse (not illustrated) from the control unit 120.

The filter circuit 4 is connected subsequent to the inverter circuit 3. The filter circuit 4 removes and outputs a high frequency component included in the output from the inverter circuit 3. The filter circuit 4 is provided with a reactor L2 and a condenser C3.

(3) Configuration of Control Unit

With continuous reference to FIG. 1, a configuration of the control unit 120 will be described.

The control unit 120 is provided with an operating signal generation unit 121, an inverter driving unit 122 which is connected to an output side of the operating signal generation unit 121, an intermediate voltage target value setting unit 123, a step-up chopper control unit 124 connected to an output side of the intermediate voltage target value setting unit 123 and a step-up chopper driving unit 125 connected to an output side of the step-up chopper control unit 124. In the present embodiment, the operating signal generation unit 121, the intermediate voltage target value setting unit 123 and the step-up chopper control unit 124 are constituted using a digital signal processing circuit or a microcomputer.

The operating signal generation unit 121 generates the drive pulse G2 which drives the inverter circuit 3, and an operating signal MV1 which defines a pulse width of G3. The operating signal generation unit 121 is provided with a subtracter 121a, a PI controller 121b provided on an output side of the subtracter 121a, a divider 121c and an adder 121d provided on an output side of the divider 121c. A detected value of an output current Io and a reference current Io (ref) are input in the subtracter 121a. Here, the reference current Io (ref) is generated by a reference current generating circuit which is not illustrated, and represents an ideal waveform of the output current Io. The subtracter 121a outputs a difference between the output current Io and the reference current Io (ref) as an error signal e1. The error signal e1 is input in the PI controller 121b, and the PI controller 121b generates a feedback signal FB in accordance with the error signal e1 by PI control. Grid voltage Vs and intermediate voltage Vd are input in the divider 121c, and the divider 121c generates a feed forward signal FF which represents a ratio of the grid voltage Vs to the intermediate voltage Vd. The feedback signal FB and the feed forward signal FF are input in the adder 121d, and the adder 121d outputs an added result of the feedback signal FB and the feed forward signal FF as the operating signal MV1.

The inverter driving unit 122 drives the inverter circuit 3 in response to the operating signal MV1. The inverter driving unit 122 is provided with a pulse width modulation (PWM) comparator 122a, a dead time insertion circuit 122b provided on an output side of the PWM comparator 122a, a driver 122c, a driver 122d, a driver 122e and a driver 122f which are provided on an output side of the dead time insertion circuit 122b. The operating signal MV1 and a triangular wave signal TRI1 are input in the PWM comparator 122a. The amplitude of the triangular wave signal TRI1 is set in a range of −1 to 1 (see FIG. 2). The PWM comparator 122a compares the operating signal MV1 with the triangular wave signal TRI1 and, if the operating signal MV1 is larger than the triangular wave signal TRI1, outputs a high-level PWM signal and, if the operating signal MV1 is smaller than the triangular wave signal TRI1, outputs a low-level PWM signal. The dead time insertion circuit 122b outputs two complementary PWM signals; dead time has been inserted in these PWM signals from the PWM comparator 122a. The driver 122c electrically insulates one of the PWM signals output by the dead time insertion circuit 122b and then outputs the PWM signal as the drive pulse G2. The drive pulse G2 is applied to a gate of the switching element Q2 on a positive side of the inverter circuit 3 and switches on and off of the switching element Q2. The driver 122e electrically insulates one of the PWM signals output by the dead time insertion circuit 122b and then outputs the PWM signal as the drive pulse G2'. The drive pulse G2' is applied to a gate of the switching element Q5 on a negative side of the inverter circuit 3 and switches on and off of the switching element Q5. The driver 122d electrically insulates the other of the PWM signals output by the dead time insertion circuit 122b and then outputs the PWM signal as the drive pulse G3. The drive pulse G3 is applied to a gate of the switching element Q3 on the negative side of the inverter circuit 3 and switches on and off of the switching element Q3. The driver 122f electrically insulates the other of the PWM signals output by the dead time insertion circuit 122b and then outputs the PWM signal as the drive pulse G3'. The drive pulse G3' is applied to a gate of the switching element Q4 on a positive side of the inverter circuit 3 and switches on and off of the switching element Q4.

The intermediate voltage target value setting unit 123 sets an intermediate voltage target value SV2 in accordance with the operating signal MV1 generated by the operating signal generation unit 121. An operation of the intermediate voltage target value setting unit 123 will be described below.

The step-up chopper control unit 124 controls the step-up chopper circuit 2 such that the intermediate voltage Vd becomes the intermediate voltage target value SV2 set by the intermediate voltage target value setting unit 123. The step-up chopper control unit 124 is provided with a subtracter 124a and a PI controller 124b provided on an output side of the subtracter 124a. A detected value of the intermediate voltage Vd and the intermediate voltage target value SV2 are input in the subtracter 124a. The subtracter 124a outputs a difference between the detected value of the intermediate voltage Vd and the intermediate voltage target value SV2 as an error signal e2. The error signal e2 is input in the PI controller 124b and the PI controller 124b generates an operating signal MV2 from the error signal e2 by PI control.

The step-up chopper driving unit 125 drives the step-up chopper circuit 2 in response to the operating signal MV2. The step-up chopper driving unit 125 is provided with a PWM comparator 125a and a driver 125b provided on an output side of the PWM comparator 125a. The operating signal MV2 and a triangular wave signal TRI2 are input in the PWM comparator 125a. The amplitude of the triangular wave signal TRI2 is set in a range of 0 to 1. The PWM comparator 125a compares the operating signal MV2 with the triangular wave signal TRI2 and, if the operating signal MV2 is larger than the triangular wave signal TRI2, outputs a high-level PWM signal and, if the operating signal MV2 is smaller than the triangular wave signal TRI2, outputs a low-level PWM signal. The driver 125b performs, for example, amplification of the PWM signal output by the PWM comparator 125a, and then outputs the PWM as the drive pulse G1. The drive pulse G1 is applied to a gate of the switching element Q1 of the step-up chopper circuit 2, and switches on and off of the switching element Q1.

Figure 2:
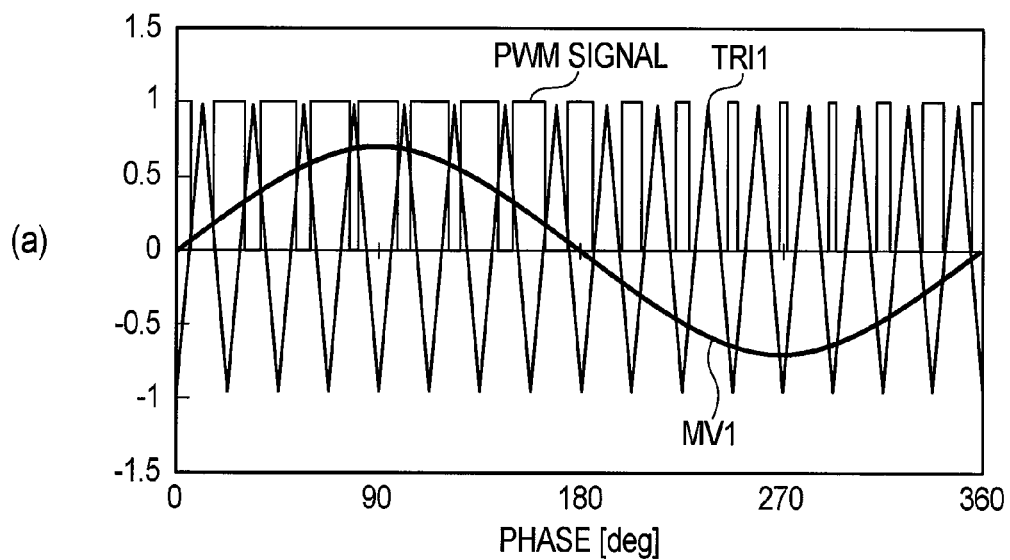
FIG. 2 is a diagram for illustrating a modulation factor.
Figure 2:
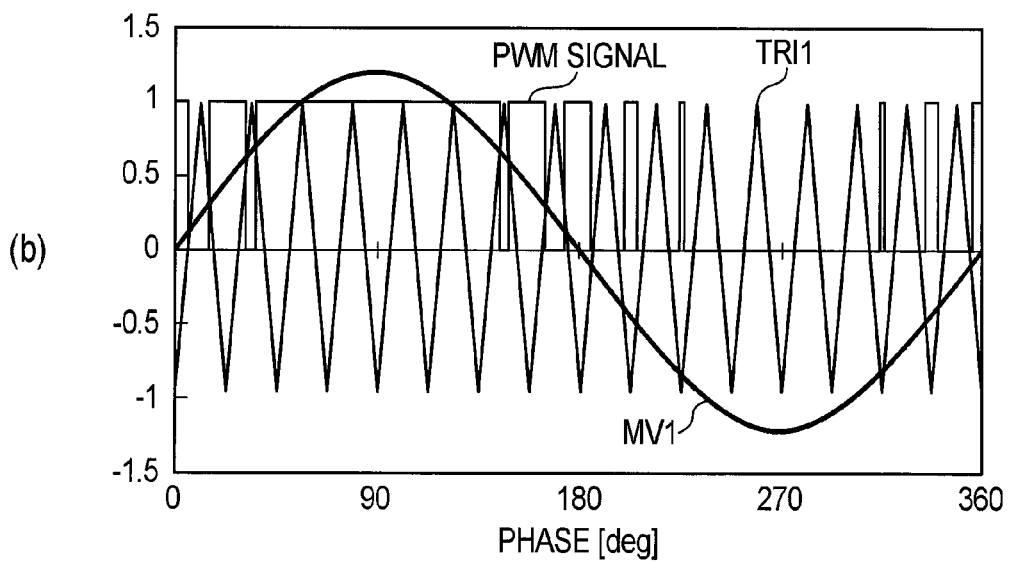

FIG. 2 is a diagram for illustrating a modulation factor. The PWM comparator 122a for drive-controlling the inverter circuit 3 uses the triangular wave signal TRI1 as a carrier wave and performs pulse width modulation (PWM) control of a carrier modulation system using the operating signal MV1 as the signal wave. That is, the pulse width of the drive pulses G2 and G3 is determined by the amplitude of the operating signal MV1. A ratio of the amplitude of the operating signal MV1 to the amplitude of the triangular wave signal TRI1 (MV1/TRI1) is referred to as a modulation factor. In FIG. 2(a), the ratio is 0.7/1.0=0.7 and the modulation factor is 1 or smaller, which is thus a condition of an under modulation. In FIG. 2(b), the ratio is 1.2/1.0=1.2 and the modulation factor is 1 or larger, which is thus a condition of an over modulation.

(4) Operation of Control Unit

Figure 3:
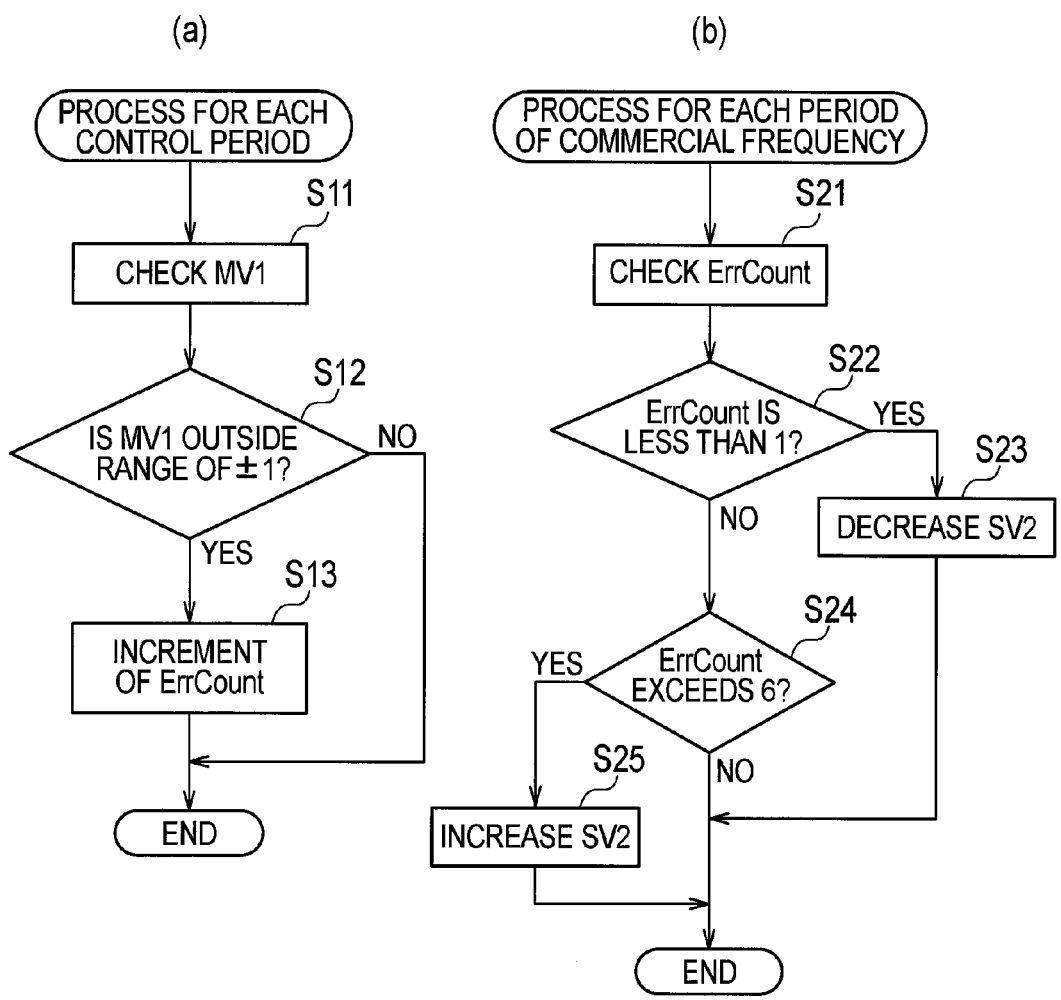
FIG. 3 is a flowchart illustrating an operation of an intermediate voltage target value setting unit according to the embodiment of the present invention.

Next, with reference to FIG. 3, an operation of the intermediate voltage target value setting unit 123 will be described.

FIG. 3(a) is a flowchart illustrating a process for each control period. The control period is a period shorter than each period of commercial frequency and is, for example, a period corresponding to 20 kHz.

As illustrated in FIG. 3(a), in step S11, the intermediate voltage target value setting unit 123 checks a value of the operating signal MV1 generated by the operating signal generation unit 121.

The intermediate voltage target value setting unit 123 compares the value of the operating signal MV1 with a target modulation factor (±1) and, if the value of the operating signal MV1 is outside the range of ±1 (corresponding to modulation factor of 0 to 100%) (step S11; YES), add an increment of a counted value ErrCount, i.e., adds 1, in step S13. In this manner, the number of times that the modulation factor becomes the condition of over modulation is counted.

The value to be compared with the operating signal MV1 is not limited to ±1 (modulation factor: 0 to 100%) but may be, for example, ±0.98 (a value with a margin of 2% with respect to modulation factor of 100%).

FIG. 3(b) is a flowchart illustrating a process for each period of commercial frequency.

As illustrated in FIG. 3(b), in step S21, the intermediate voltage target value setting unit 123 checks the counted value ErrCount.

In step S22, the intermediate voltage target value setting unit 123 compares the counted value ErrCount with a lower limit ("1" in the present embodiment). As a result, if the counted value ErrCount is less than 1 (step S22; YES), the intermediate voltage target value setting unit 123 regards the condition as excessive intermediate voltage in step S23, and decreases the intermediate voltage target value SV2 by one level (for example, a value corresponding to 0.5V). If the counted value Err Count is 1 or larger (step S22; NO), the process proceeds to step S24.

In step S24, the intermediate voltage target value setting unit 123 compares the counted value ErrCount with a higher limit ("6" in the present embodiment). As a result, if the counted value ErrCount exceeds 6 (step S24; YES), the intermediate voltage target value setting unit 123 regards the condition as under intermediate voltage in step S25, and increases the intermediate voltage target value SV2 by one level (for example, a value corresponding to 0.5V). If the counted value ErrCount is six or smaller (step S24; NO), the process is completed.

Although an appropriate range of the counted value ErrCount is 1 to 6 in the present embodiment, this range is not restrictive and other range, such as 2 to 7, may also be employed. Although the increase width and the decrease width of the intermediate voltage target value SV2 are the same in the present embodiment, the increase width may be greater than the decrease width from the viewpoint of necessity of avoiding current distortion. For example, the setting to decrease the intermediate voltage target value SV2 by one level when it is regarded as excessive intermediate voltage, and to increase the intermediate voltage target value SV2 by two levels when it is regarded as under intermediate voltage may be employed.

Figure 4:
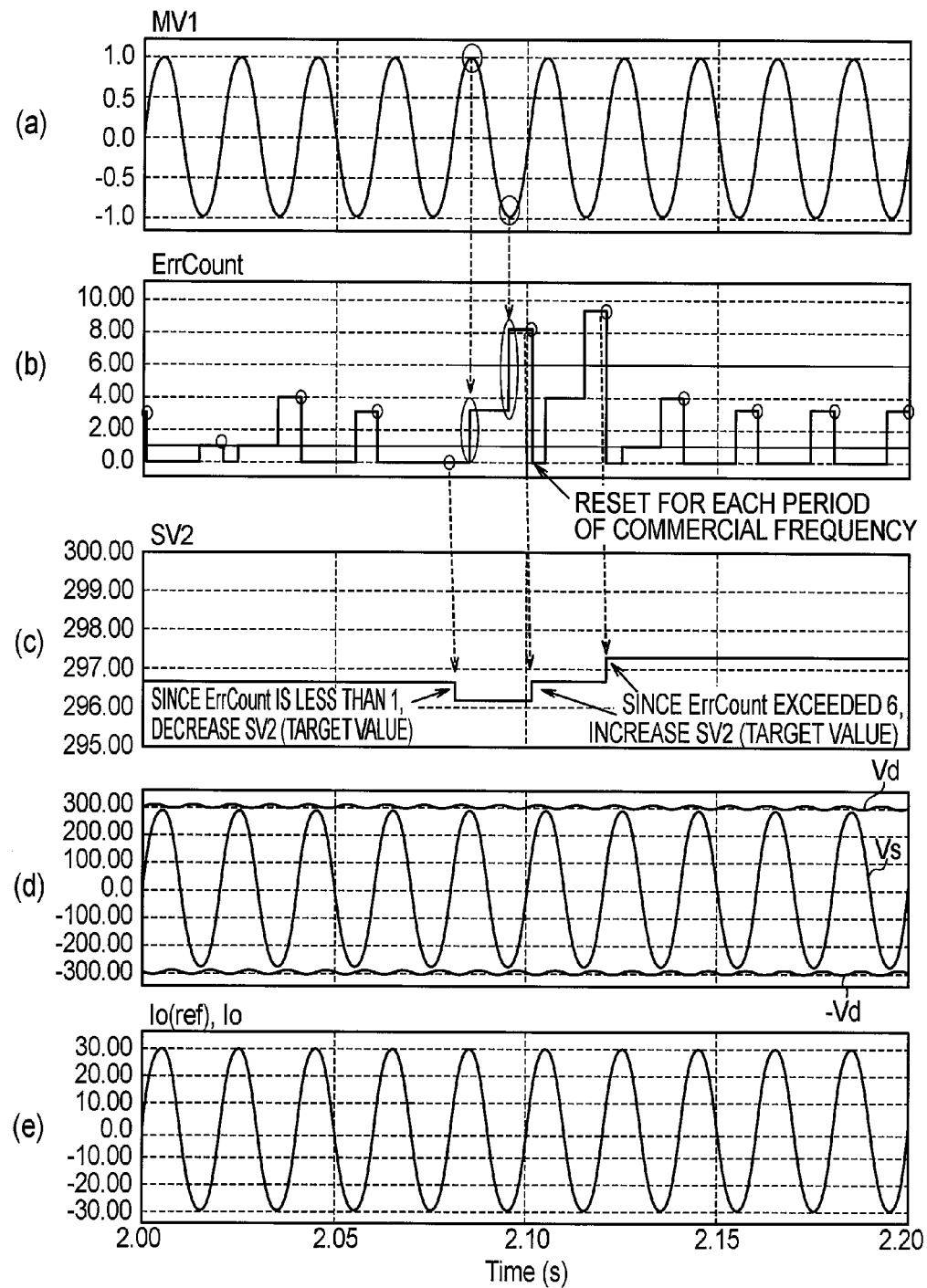
FIG. 4 is a waveform chart for illustrating an operation of control unit according to the embodiment of the present invention.

FIG. 4 is a waveform chart for illustrating an operation of the control unit 120.

As illustrated in FIG. 4(a), the operating signal MV1 is a waveform on a sinusoidal wave, and is changed in a range of about −1.0 to about 1.0.

As illustrated in FIG. 4(b), the intermediate voltage target value setting unit 123 counts up the counted value ErrCount. Timing illustrated with a circle in FIG. 4(b) is timing of each period of commercial frequency. The intermediate voltage target value setting unit 123 determines the counted value ErrCount at this timing and then resets the counted value ErrCount.

As illustrated in FIG. 4(c), the intermediate voltage target value setting unit 123 increases or decreases the intermediate voltage target value SV2 such that the counted value ErrCount is in the range of 1 to 6.

With the setting method of the intermediate voltage target value SV2 described above, the step-up chopper circuit 2 is controlled to generate the intermediate voltage Vd to which an appropriate margin has been added with respect to the grid voltage Vs as illustrated in FIG. 4(d). As illustrated in FIG. 4(e), no current distortion (THD) occurs in the output current Io even near the peak value.

As described above, the intermediate voltage target value setting unit 123 increases the intermediate voltage target value SV2 in accordance with the increase of the peak value of the operating signal MV1 exceeding the range of ±1 corresponding to the range of the modulation factor of 0 to 100%. This is because, in a condition in which the peak value of the operating signal MV1 exceeds the range of ±1, the intermediate voltage Vd is low with respect to the output voltage V0 that the inverter circuit 3 should output and thus there is a possibility that the output current of the inverter circuit 3 is distorted near the peak value.

The intermediate voltage target value setting unit 123 decreases the intermediate voltage target value SV2 in accordance with the peak value of the operating signal MV1 not exceeding the range of ±1 corresponding to the modulation factor of 0 to 100%. This is because, in a condition in which the peak value of the operating signal MV1 does not exceed the range of ±1, the intermediate voltage is high with respect to the AC voltage that the inverter circuit 3 should output and thus there is a possibility that switching loss of the device in the main circuit 110 increases.

(5) Operation and Effect

The intermediate voltage target value setting unit 123 sets the intermediate voltage target value SV2 in accordance with the operating signal MV1 which define the modulation factors of the drive pulses G2 and G3 which drive the inverter circuit 3. Therefore, the intermediate voltage target value SV2 can be set in consideration of the modulation factor of the inverter circuit 3, i.e., the intermediate voltage target value SV2 can be set while suppressing the influence of, for example, the amount of the output of the inverter circuit 3 and variation in the element characteristics, whereby the intermediate voltage Vd can be controlled properly.

In the first embodiment, the intermediate voltage target value setting unit 123 can avoid distortion of the output current of the inverter circuit 3 near the peak value by increasing the intermediate voltage target value SV2 by a predetermined increment (for example, +1) in accordance with the increase of the peak value of the operating signal MV1 which defines the modulation factor exceeding the range of ±1 corresponding to the range of the modulation factor of 0 to 100%.

Further, in the first embodiment, the intermediate voltage target value setting unit 123 can avoid an increase in the switching loss of the device in the main circuit 110 by decreasing the intermediate voltage target value SV2 by a predetermined decrement (for example, −1) in accordance with the peak value of the operating signal MV1 which defines the modulation factor not exceeding the range of ±1 corresponding to the modulation factor of 0 to 100%.

In the first embodiment, since each of the step-up chopper circuit 2 and the inverter circuit 3 is controlled in an integrated manner in accordance with a common manipulation signal MV1, the control can be simplified and control burden can be reduced.

(6) Modification 1

Next, Modification 1 of the process in the intermediate voltage target value setting unit 123 will be described. In Modification 1, the intermediate voltage target value setting unit 123 significantly increases the intermediate voltage target value SV2 in accordance with the increase of the peak value of the operating signal MV1 exceeding a range wider than the range of ±1 corresponding to the modulation factor of 0 to 100% (the range of ±1.2 in Modification 1).

Figure 5:
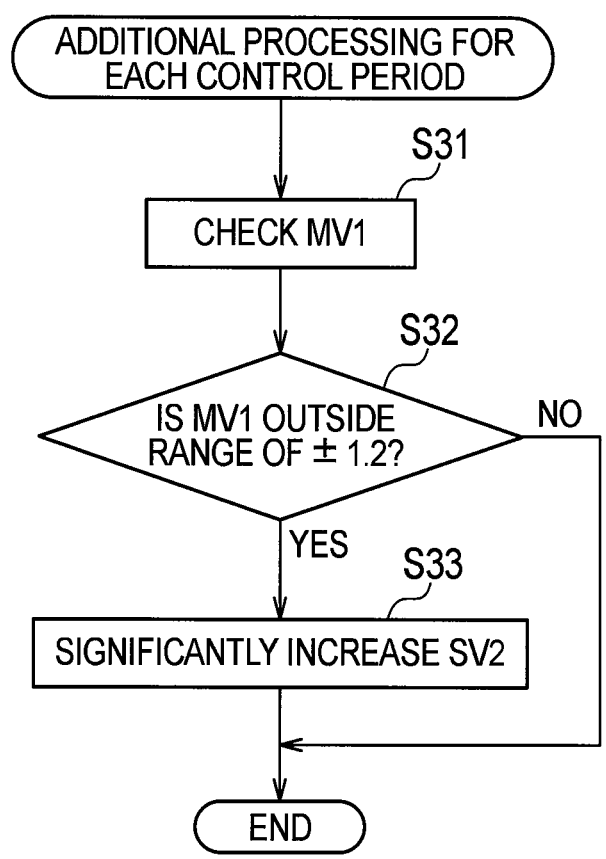
FIG. 5 is a flowchart illustrating an operation of an intermediate voltage target value setting unit according to Modification 1 of the embodiment of the present invention.

FIG. 5 is a flowchart illustrating a process for each control period in the intermediate voltage target value setting unit 123 according to Modification 1. The process of FIG. 5 may be performed in combination with the process for each control period according to the embodiment described above. However, the process of FIG. 5 is not limited to be performed in combination with the process for each control period according to the embodiment described above, but may replace the process for each control period according to the embodiment described above.

As illustrated in FIG. 5, in step S31, the intermediate voltage target value setting unit 123 checks a value of the operating signal MV1 generated by the operating signal generation unit 121.

The intermediate voltage target value setting unit 123 compares the value of the operating signal MV1 with a predetermined value (±1.2) and, if the value of the operating signal MV1 is outside the range of ±1.2 (step S32; YES), increases the intermediate voltage target value SV2 by two or more levels (for example, a value corresponding to 5V) in step S33.

Under the condition that the peak value of the operating signal MV1 is out of the range of ±1.2, the intermediate voltage becomes too low with respect to the AC voltage that the inverter circuit 3 should output, and thus there is a possibility that the output current of the inverter circuit 3 is distorted significantly near the peak value. In such a case, in Modification 1, distortion of the output current of the inverter circuit 3 near the peak value can be avoided by increasing the intermediate voltage target value SV2 by an amount greater than that in the embodiment described above to thereby achieve rapid response.

(7) Modification 2

In particular, a solar cell is exemplified as the DC power supply in the first embodiment. In contrast, a storage battery is exemplified as the DC power supply in Modification 2. The operating signal is controlled in accordance with the intermediate voltage target value in the first embodiment. In contrast, the operating signal is controlled in accordance with the target modulation factor without using the intermediate voltage target value in Modification 2.

Figure 6:
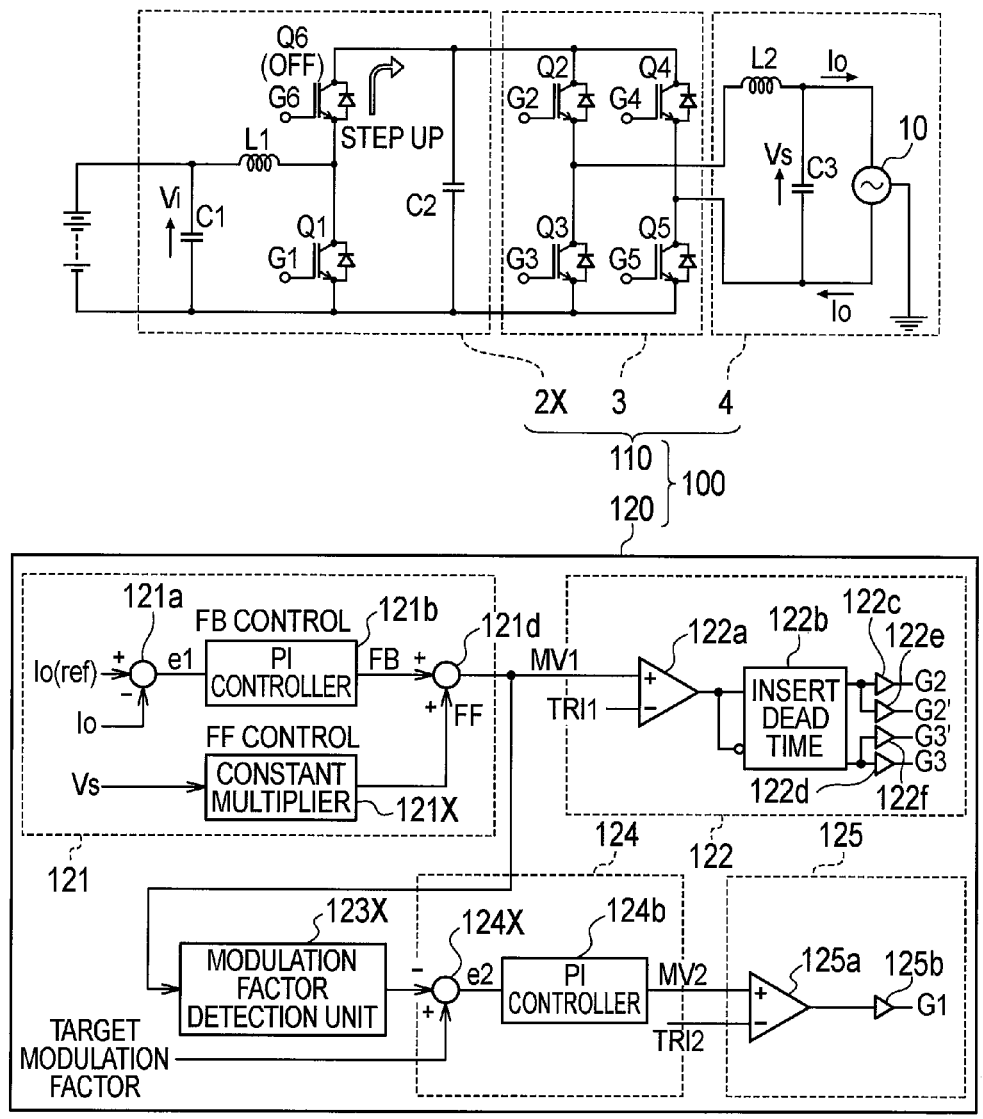
FIG. 6 is a diagram illustrating a configuration of a grid interconnection system provided with a grid interconnection apparatus according to Modification 2 of the present invention.

FIG. 6 is a configuration diagram of a grid interconnection system including a grid interconnection apparatus 100 according to Modification 2.

As illustrated in FIG. 6, the grid interconnection apparatus 100 is provided with a storage battery 1X in place of the solar cell 1, and a chopper circuit 2X in place of the step-up chopper circuit 2.

The storage battery 1X can be charged with electricity (charge). That is, the storage battery 1X has a function to be charged with electricity (charge) supplied from the distribution system 10. The storage battery 1X can discharge electricity. That is, the storage battery 1X has a function to supply the distribution system 10 with electricity charged in itself.

Hereinafter, control to discharge electricity will be referred to as discharge control. Control to be charged with electricity will be referred to as charge control.

The chopper circuit 2X controls the input voltage V1 from the storage battery 1X, or controls the input voltage V1 to the storage battery 1X. In Modification 2, the chopper circuit 2X steps up the input voltage V1 in the discharge control by performing high-frequency switching of the input voltage V1 from the storage battery 1X. On the other hand, in the charge control, the chopper circuit 2X steps down the input voltage V1 to the storage battery 1X by performing high-frequency switching of the input voltage V1.

In Modification 2, the chopper circuit 2X is provided with a switching element Q6 in addition to the switching element Q1. The switching element Q1 controls the chopper circuit 2X in the discharge control. The switching element Q6 controls the chopper circuit 2X in the charge control. In Modification 2, the switching element Q1 and the switching element Q6 are constituted by an IGBT.

The operating signal generation unit 121 is provided with a constant multiplier 121X in place of the divider 121c. The constant multiplier 121X multiplies the grid voltage Vs by a predetermined count k to generate a feed forward signal FF.

The control unit 120 is provided with a modulation factor detection unit 123X in place of the intermediate voltage target value setting unit 123. The modulation factor detection unit 123X detects a modulation factor which is an amplitude ratio between the operating signal MV1 (a signal wave) and the triangular wave signal TRI1 (a carrier wave). Here, the modulation factor detection unit 123X detects the peak value of the operating signal MV1 for each period of a grid voltage fundamental wave. The modulation factor detection unit 123X detects a modulation factor by dividing the peak value of the operating signal MV1 as the amplitude by the amplitude (constant) of the triangular wave signal TRI1.

The step-up chopper control unit 124 is provided with a subtracter 124b in place of the subtracter 124a. The subtracter 124b outputs, as an error signal e2, a value obtained by subtracting a target modulation factor (±1) from the modulation factor detected by the modulation factor detection unit 123X. The PI controller 124b described above generates an operating signal MV2 from the error signal e2 by PI control.

Therefore, in Modification 2, it is possible to use the storage battery 1X in place of the solar cell 1. It is possible to control the control signal MV1 without using the intermediate voltage target value; i.e., it is possible to omit the measurement of the intermediate voltage and control the control signal MV1 in accordance with a comparison result of the modulation factor and the target modulation factor. Of course, even if the DC power supply is the solar cell 1, it is possible to omit the measurement of the intermediate voltage and control the control signal MV1 in accordance with the comparison result of the modulation factor and the target modulation factor.

The grid interconnection apparatus 1 according to Modification 2 can be used for discharge control and charge control.

(8) Other Embodiments

As described above, although the present invention has been described with reference to the embodiment, it should not be understood that the discussion and the drawings which constitute a part of the present invention is restrictive to the invention. Various alternatives, examples and operational techniques will be clear to a person skilled in the art from this disclosure.

In each embodiment described above, the solar cell 1 is exemplified as a DC power supply but the DC power supply is not limited to the solar cell; a fuel cell, for example, may be used as the DC power supply.

The main circuit 110 according to the embodiment described above is illustrative only; a high-frequency insulated DC-DC converter, for example, may be used in place of the step-up chopper circuit 2. In a case in which voltage of the DC power supply is higher than voltage of the distribution system, a step-down converter may be used in place of the step-up chopper circuit 2.

It is to be understood that the present invention encompasses, for example, various other embodiments not expressly stated herein. Accordingly, the present invention shall only be limited by the matter to define the invention to be reasonably understood from this disclosure and defined by the appended claims.

The entire content of Japanese Patent Application No. 2010-042445 (filed Feb. 26, 2010) is incorporated to the specification of the present application by reference.

Industrial Applicability

According to the present invention, a power converting apparatus, a grid interconnection apparatus and a grid interconnection system capable of properly control the intermediate voltage can be provided.

The invention claimed is:

1. A power converting apparatus which includes a DC-DC converter circuit configured to step up or down input voltage from a DC power supply, a DC-AC converter circuit configured to convert output voltage of the DC-DC converter circuit into alternating-current power and to provide the alternating-current power to a grid, and a control unit configured to control the DC-DC converter circuit and the DC-AC converter circuit,
   wherein the control unit is configured to generate a first signal based on an output current of the DC-AC converter circuit, a target current of the output current and a grid voltage, to control the DC-AC converter circuit by a signal generated from the first signal and a carrier wave by use of PWM (pulse width modulation), and to control the DC-DC converter circuit such that an amplitude ratio between the first signal and the carrier wave becomes a target amplitude ratio.

2. The power converting apparatus according to claim 1 wherein:
   the control unit sets a target voltage value of the output voltage in accordance with the first signal, and
   the control unit controls the DC-DC converter circuit such that the output voltage becomes the target voltage value.

3. The power converting apparatus according to claim 2, wherein, the control unit increases the target voltage value when the amplitude ratio exceeds the target amplitude ratio.

4. The power converting apparatus according to claim 2, wherein, the control unit sets an increase width of the target voltage value as a first increase width when a value by which the amplitude ratio exceeds the target amplitude ratio is smaller than a predetermined value, and the control unit sets an increase width of the target voltage value as a second increase width larger than the first increase width when a value by which the amplitude ratio exceeds the target amplitude ratio is the same as or larger than the predetermined value.

5. The power converting apparatus according to claim 2, wherein, the control unit decreases the target voltage value when the amplitude ratio is smaller than the target amplitude ratio.

6. The power converting apparatus according to claim 1, wherein the DC power supply is a solar cell, a fuel cell or a storage battery.

7. A grid interconnection system comprising the DC power supply and the power converting apparatus according to claim 1.

8. The power converting apparatus according to claim 1, wherein
   the control unit generates a second signal from a difference between the output current and the target current by use of PI (proportional/integral) control, and
   the control unit generates the first signal by adding a third signal derived from the grid voltage to the second signal.

9. The power converting apparatus according to claim 8, wherein the third signal is a ratio of the grid voltage to the output voltage.

10. The power converting apparatus according to claim 8, wherein the third signal is a predetermined multiple of the output voltage.

11. A power converting apparatus which includes a DC-DC converter circuit configured to step up or down input voltage from a DC power supply a DC-AC converter circuit configured to convert intermediate voltage output by the DC-DC converter circuit into alternating-current and a control unit configured to control the DC-DC converter circuit and the DC-AC converter circuit,
  wherein the control unit is provided with a circuit control unit configured to control the DC-DC converter circuit such that a modulation factor which is an amplitude ratio between a signal wave and a carrier wave which manipulate the DC-AC converter circuit becomes a target modulation factor,
the power converting apparatus further comprising:
an operating signal generation unit configured to generate an operating signal as the signal wave; and
a target value setting unit configured to set a target voltage value of the intermediate voltage in accordance with the operating signal generated by the operating signal generation unit,
wherein
the circuit control unit controls the DC-DC converter circuit such that the intermediate voltage becomes the target voltage value, and
the target value setting unit sets an increase width of the target voltage value as a first increase width when a value by which the modulation factor exceeds the target modulation factor is smaller than predetermined value, and the target value setting unit sets an increase width of the target voltage value as a second increase width larger than the first increase width when a value by which the modulation factor exceeds the target modulation factor is the same as or larger than the predetermined value.

\* \* \* \* \*